EMERGENCY REPORTING TELEPHONE SYSTEM FOR HIGHWAYS

Filed Nov. 30, 1966

INVENTOR
W. E. CARLE
BY [signature]
ATTORNEY 3,471,649
Patented Oct. 7, 1969

3,471,649

EMERGENCY REPORTING TELEPHONE SYSTEM FOR HIGHWAYS

William E. Carle, Schenectady, N.Y., assignor to American Telephone and Telegraph Company, New York, N.Y., a corporation of New York Filed Nov. 30, 1966, Ser. No. 597,972
Int. Cl. H04m 5/04, 3/56
U.S. Cl. 179—35 13 Claims

ABSTRACT OF THE DISCLOSURE

An emergency phone system including means for clearing the line of substations which are "off-hook" by releasing a relay which holds the substation on the line from the central office. Upon occurrence of an on-hook condition a capacitor is charged at the substation. Upon occurrence of an off-hook condition, the discharge from this capacitor is used to energize a relay which switches the substation from the "control" leads to the "talk" leads. The substation is normally held on the "talk" leads until a succeeding "on-hook" condition by current supplied to said relay over the control leads from the central station.

This invention relates to a telephone system and more particularly to a highway emergency reporting telephone system.

With the present day prevalence of heavily traveled throughways and express highways it is of increasing importance to provide efficient means for communication between the travelers and the headquarters of the particular body of police responible for the coverage of the area in which the traveler finds himself. In the event of an emergency the ability to quickly contact the proper authorities may well result in preventing loss of life or property.

Emergency reporting systems have, of course, previously been provided along certain highways, but none of these has successfully solved all of the many problems which are inherent in this general type of communication service. For example, a particularly vexing problem is involved in the relatively high incidence of "off-hook" situations encountered in the provision of highway emergency reporting service. This results both from the fact that the user often fails to restore the receiver at the completion of a call due to conditions of stress incident to the emergency as well as to the fact that the telephone sets are often located in somewhat secluded spots, which circumstance is apt to encourage acts of mischief and actual vandalism. A prevalent off-hook situation is apt to result in a more or less constant loss of signaling and supervisory facilities on the loop. Again, the problem of assuring a sufficiently high transmission level to offset the high ambient noise level inherent in this type of service has usually been troublesome.

Accordingly, it is an object of my invention to improve the operation of highway emergency reporting systems.

Another object of my invention is to alleviate operating difficulties in a highway emergency reporting system resulting from a prevalency of off-hook conditions.

Yet another object of my invention is to improve the transmission level in a highway emergency reporting system.

A still further object of my invention is to control from a central station the condition of the separated telephone sets with respect to their connected or non-connected relationship to the talking loop.

A more specific object of my invention is to test the continuity on an emergency reporting line in an efficient, simple manner.

In accordance with a specific embodiment of my invention a highway emergency reporting telephone system utilizes a two-pair loop between the area police station and the telephone sets provided at separated points for the protected segment. One pair, the talk pair, is inductively loaded and the other pair, the control pair, is nonloaded. A capacitor is connected across the control pair at each telephone set location and is maintained in charged condition, so long as the respective telephone set is on-hook, by potential supplied from the police station. When a set goes off-hook to initiate a call, the capacitor discharges through the operate winding of a local relay which operates and connects the telephone set across the talk pair to the police station.

When a call is answered at the police station, ground is applied to the control pair whereby to discharge the capacitors of all of the other telephone sets so that no other set can initiate a call to the police station until the first call has been completed. When the attendant goes on-hook after completing a call or after "answering" a wrongful off-hook, the loop potential is momentarily removed from the talk pair and the telephone set is disconnected from the loop whether or not it goes back on-hook. The attendant thus has full control over the condition of the telephone sets included in the segment. If a telephone set be found in off-hook condition when a call is to be initiated, the capacitor will, of course, be discharged and the set inoperative. However, only a momentary, on-hook, such as a "jiggle" of the switchhook, will cause the capacitor to be recharged and the call may then be initiated.

A feature of my invention is means associated with each separated telephone set whereby a telephone set wrongfully off-hook may be quickly restored to operative condition for initiating a call.

Another feature of my invention is means whereby an off-hook telephone set can be disconnected from the talk loop by the control station.

A still further feature of my invention resides in novel inductive means connected in the talk pair and effective when a telephone set is connected across the talk pair to remove the bridging effect of elements in the pair beyond the point at which the telephone set is connected.

Yet another feature of my invention is means for automatically testing the continuity of the line when no calls are in progress and for activating an alarm in the event of an open or a ground.

A full understanding of the arrangement contemplated by the present invention as well as an appreciation of the various advantageous features thereof may be gained from consideration of the following detailed description in connection with the accompanying drawing in which.

GENERAL DESCRIPTION

Figures 1, 4:
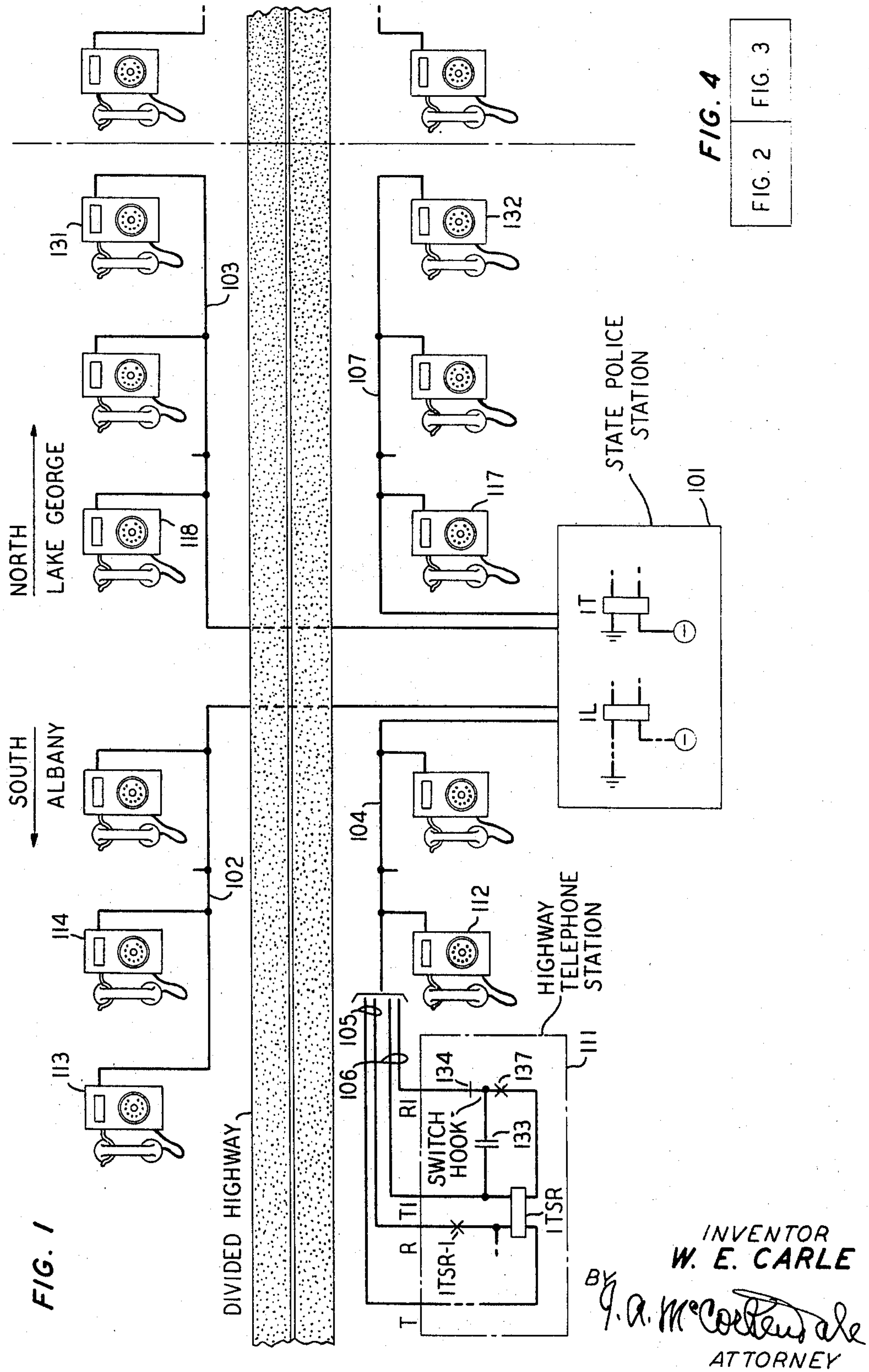
FIG. 1 shows in schematic form the general arrangement of one specific illustrative embodiment of the highway emergency reporting telephone system contemplated by my invention.
FIG. 4 shows the manner in which certain of the figures should be arranged to show the specific illustrative embodiment of the invention.

The arrangement and operation of the various components of the illustrative embodiment of my invention will be described in detail subsequently with reference to FIGS. 2 and 3. However, in order to first gain a general overall understanding of the arrangement contemplated, a brief general description will be given at this point with particular reference to FIG. 1. Referring, therefore, to FIG. 1 there is shown the segment of the emergency reporting system covering the particular area over which the state police of station 101 have jurisdiction. As indicated four communication loops extend from the station, the loops utilizing cables 102 and 103 serving the southbound half of the highway and the loops utilizing cables 104 and 107 serving the northbound half. Cables 102 and 104 extend to the southern boundary of the jurisdictional area and cables 103 and 107 extend to the northern boundary. Other segments of the highway will preferably be covered by similar loops terminating at the state police station responsible for the particular area; a portion of the next northerly loop is indicated in the drawing.

Each loop comprises two pairs of conductors, a talk pair, which in the specific illustrative embodiment is inductively loaded, and a control pair which is nonloaded; talk pair 105 and control pair 106 of loop 104 are shown in part in the drawing. Telephone sets, as 111; 112; 113; 114; 117; 118; 131; 132 are provided on the loops at suitable spacings; for example it has been found in one installation that the sets should ideally be located at intervals of about ½ mile on both sides of the highway. The telephone sets may be any one of the various types of station sets now generally available, and may, if desired, be mounted in booths or enclosed in "drive-up" housings.

As indicated in FIG. 1 in connection with telephone set 111, and as will be described in detail subsequently with reference to FIGS. 2 and 3, there is provided in accordance with one specific illustrative embodiment of my invention at each telephone set location a capacitor which is connected across the control pair; as shown capacitor 133 is connected across control pair 106 at the location of telephone set 111. As will also be described in further detail subsequently, under normal conditions, that is when no call is in progress, a potential is connected to lead R1 of the control pair at station 101, which potential is effective to charge each capacitor so long as the respective telephone set is on-hook; thus capacitor 133 is charged over lead R1 of control pair 106 so long as the telephone set is on-hook and break contact 134 is closed. When the set goes off-hook, however, and make contact 137 is closed and break contact 134 opened, capacitor 133 is disconnected from the control pair and now discharges through the operate winding of telephone set relay 1TSR whereby to operate that relay.

Relay 1TSR, upon operating, closes at its make contact 1TSR–1 a path (shown completely in FIG. 3 and further described subsequently with reference to that figure) whereby telephone set 111 is connected across the T and R leads of talk pair 105. Battery and ground are applied to the talk pair at station 101 and this potential applied to the left, holding, winding of relay 1TSR locks in the connection of the telephone set to the talk pair.

Closure of the line loop through the telephone set results in certain operations at the state police station which will be described in detail subsequently with reference to FIGS. 2 and 3. Among these operations is operation of the line relay associated with the particular loop which has been closed, for example relay 1L. Operation of the line relay is effective to remove battery potential from lead R1 of the control pair and to substitute ground therefor; this is effective to discharge the capacitors with all telephone sets of the loop except telephone set 111 so that none of the other sets can initiate a call until telephone set 111 has completed its call. Also line relay 1L, operated, closes a path for lighting the associated line lamp on the attendant's telephone set at the control station. When the attendant answers the call by depressing the line key, relay 1T operates.

When the attendant goes on-hook after handling a call relay 1T releases and the loop potential is momentarily removed from the talk pair; the telephone station relay, as 1TSR, releases upon removal of the loop potential so that the telephone set is cut off from the loop regardless of whether or not it goes back on-hook. The attendant at the police station, therefore, has complete control over the connection to the telephone set which initiated the call and can cut the set off the line even though it remains off-hook and, conversely, can maintain the loop closure through the telephone set even though it may have gone on-hook.

If a traveler finds a telephone set in off-hook condition when preparing to initiate a call, the capacitor will, of course, be discharged and the telephone set inoperative. However, a momentary closure of the switchhook, such as the customary "jiggle" of the hook, will result in the capacitor being charged and the call may be initiated in the usual manner. Also, any intervening sets which are wrongfully off-hook will not interfere with the normal use of the loop since at the time such an off-hook signal is "answered" by the attendant and found not to be a legitimate call the set would be cut off the loop by the attendant's act of going on-hook as described above.

It will be clear from the description immediately preceding that the problem of off-hook sets which has been so troublesome in the instance of previously known highway emergency telephone reporting systems is successfully met by the novel arrangement contemplated by my invention, this being true both with regard to the initiating set being found off-hook as well as with regard to one or more intervening sets being off-hook.

DETAILED DESCRIPTION

Figure 2:
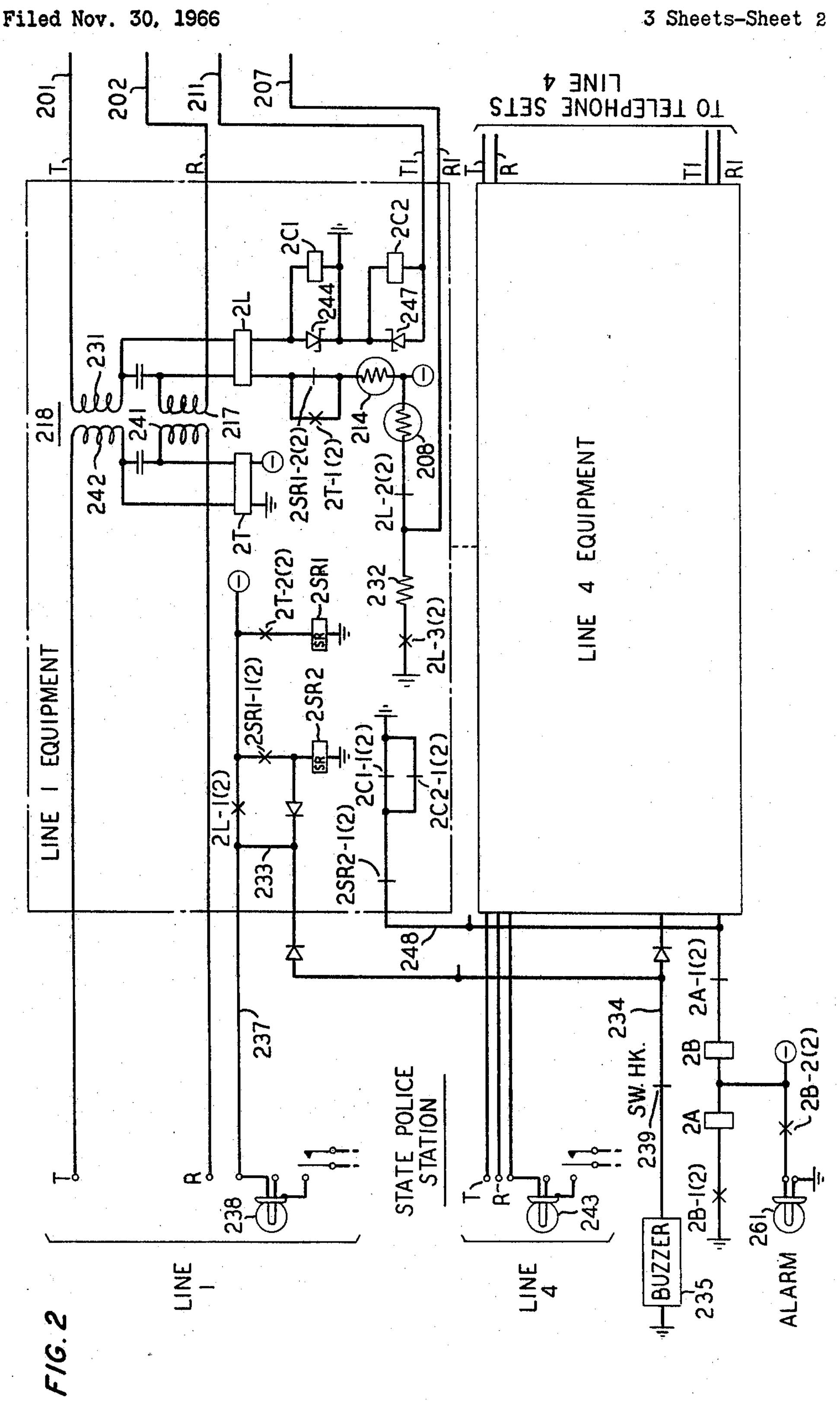
FIG. 2 shows particularly the line equipment provided at the police station, the equipment of line No. 1 and the equipment common to all the lines being shown in detail and that of the other lines being indicated by dotted line and a captioned box.
Figure 3:
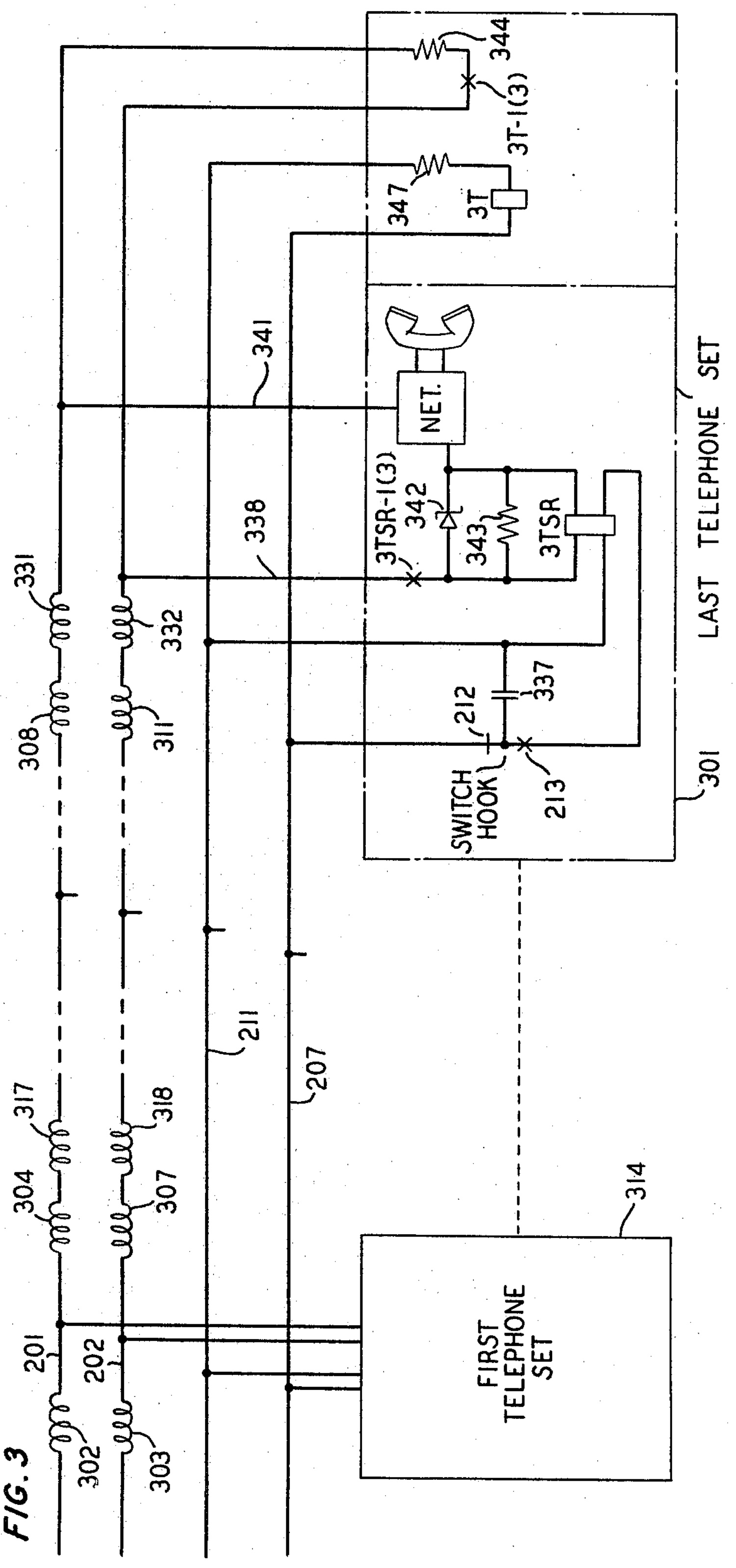
FIG. 3 shows particularly the line arrangement, one telephone set being shown in partial detail and others being indicated by dotted line and a captioned box.

Coming now to a more detailed description of the specific illustrative embodiment of the invention with particular reference to FIGS. 2 and 3 of the drawing, the circuits illustrated are arranged in the so-called "detached contact" type of representation wherein, generally speaking, relay contacts are shown separated from the relay winding which controls the respective contact. This type of disclosure permits functional groups of circuitry to be shown separately, thus facilitating an understanding of the operational features involved. Each designation of a relay winding is preceded by a numeral indicating the figure of the drawing in which the apparatus appears, for example the winding of relay 3TSR appearing in FIG. 3. Further, each contact designation is followed by a numeral in parenthesis which indicates the figure of the drawing in which the contact appears, for example the designation "3TSR–1(3)" which indicates that contact No. 1 of relay 3TSR appears in FIG. 3. In accord with usual circuit design, transfer contact pairs may be either early make-break (continuity) or early break-make (sequence transfer) as dictated by the particular circuit operational requirements.

Referring then to FIGS. 2 and 3 it will be assumed that a call is to be initiated from telephone set 301 which is the "last" telephone set on the loop, that is the set most remote from the controlling police station. The circuit of telephone set 301 is not shown in complete detail but it may, for example, be of the general arrangement disclosed in U.S. Patent 2,620,402, issued Dec. 2, 1952, N. Botsford et al., "Telephone Substation Circuit With Automatic Compensation for Length of Line."

As shown, the talk pair of the loop, which comprises tip lead 201 and ring lead 202, is inductively loaded by suitably located loading coils, as loading coils 302; 303; 304; 307; 308; 311. Also, each loading point except that of the first telephone set 314, is provided with an additional inductance coil in series with the line, thus coils 317 and 318 are shown provided at the second loading point and coils 331 and 332 are shown provided at the last loading point; it will be understood that the arrangement of intervening loading points is similar. The function of these coils, which will be referred to herein as "bridge lifters," will be described subsequently.

Under normal conditions that is when telephone set 301 is on-hook and a call is not in progress on the loop, capacitor 337 is charged by the battery potential applied at the police station to R1 lead 207 of the control pair through ballast lamp 208 and break contact 2L–2(2); ground is connected at the police station through the winding of relay 2C2 to T1 lead 211 of the control pair.

Assuming now that telephone set 301 goes off-hook in order to initiate an emergency reporting call to the state police station, capacitor 337 will be disconnected from the control pair at break contact 212 of the switchhook and will be connected via make contact 213 of the switchhook across the lower, operate, winding of telephone set relay 3TSR. Relay 3TSR is operated by the potential from the discharging capacitor 337 and closes at make contact 3TSR–1(3) a path connecting the upper, holding winding of relay 3TSR and the network circuit of telephone set 301 across T lead 201 and R lead 202 of the talk pair of the loop.

With the talk loop closed through telephone set 301, loop potential is now supplied through ballast lamp 214, break contact 2SR1–2(2), left winding of line relay 2L, winding 217 of repeat coil 218, ring lead 202, lead 338, make contact 3TSR–1(3), upper, hold, winding of the telephone set relay 3TSR, network circuit of telephone set 301, lead 341, tip lead 201 of loop, winding 231 of repeat coil 218, right winding of line relay 2L, winding of relay 2C1 to ground; this potential holds relay 3TSR operated whereby to hold telephone set 301 locked in to the loop.

Line relay 2L, operated, interrupts at break contact 2L–2(2) the path over which battery potential was applied to the R1 lead 207 of the control pair and closes at make contact 2L–3(2) a path for applying ground to this lead through resistor 232. This connection of ground to lead 207 in place of the battery potential previously connected thereto, results in the discharging of the capacitors associated with all the telephone sets of the loop except, of course, capacitor 337 of telephone set 301. Accordingly, none of the other telephone sets can initiate a call until the call initiated by telephone set 301 as mentioned above has been processed.

Also, line relay 2L, operated, closes at make contact 2L–1(2) a path through lead 233 for operating relay 2SR2; a path through lead 234 for activating the audible signal 235; and a path through lead 237 for lighting the lamp of combined line lamp and key 238. The attendant, responding to the audible signal and the lighted line lamp, depresses the key portion of combined lamp and key 238 whereby to connect in the usual manner of key telephone set operation his telephone set (not shown) across the station end of the talk pair. When the attendant's telephone set goes off-hook the audible signal 235 is silenced as the energizing path is interrupted at break contact 239 of the switchhook.

Connection of the attendant's telephone set across the talk pair closes a path for operating relay 2T from battery, right winding of relay 2T, winding 241 of repeat coil 218, ring lead, closed loop at attendant's telephone set (not shown), tip lead, winding 242 of repeat coil 218, left winding of relay 2T to ground. Relay 2T operates and closes at make contact 2T–2(2) an operate path for relay 2SR1 and closes at make contact 2T–1(2) an alternate path for connecting battery potential to ring lead 202. Relay 2SR1, operated, closes at make contact 2SR1–1(2) an alternate hold path for relay 2SR2. As mentioned above relay 2SR2 operated following operation of line relay 2L and, upon operating, opened a break contact 2SR2–1(2) the continuity test path which will be described subsequently.

Upon completion of the conversation the attendant will either go on-hook or will depress another line key, as combined line lamp and key 243, for handling a call on another line. Either such action will open the station loop of line No. 1 and relay 2T will release. Relay 2T, released, interrupts at make contact 2T–2(2) the operate path of relay 2SR1 and also interrupts at make contact 2T–1(2) the path over which potential has been connected to ring lead 202 of the talk path.

The talk path is momentarily without battery and ground potential due to interruption of the path at make contact 2T–1(2) since relay 2SR1 is slow-to-release and the closure of break contact 2SR1–2(2) is delayed for a predetermined interval after the operate path of relay 2SR1 has been interrupted at make contact 2T–2(2). During this interval of an absence of line potential, telephone set relay 3TSR releases and telephone set 301 is disconnected from the talk pair at make contact 3TSR–1(3). It will be clear, therefore, that the condition of the telephone sets, as set 301, with regard to connection to the talk pair is entirely under control of the attendant at the police station. Thus if the user under stress of the emergency, neglects to place the telephone set back on-hook, the attendant can nevertheless disconnect the set from the loop or, on the other hand, he can leave the set connected to the line if he wishes to monitor ambient conditions. This control feature is particularly important in connection with telephone sets which are wrongfully in off-hook condition. After responding to an off-hook signal and finding it is other than the normal call-initiating condition, the attendant, need only go on-hook and the telephone set in question will be disconnected from the talk pair. A prospective user finding the set off-hook and disconnected from the line has only to restore the switchhook momentarily, as pointed out above, after which a call can be initiated from the set in the normal manner.

Line relay 2L released upon removal of potential from the talk pair and interrupted at make contact 2L–1(2) the alternate operate path for relay 2SR2, the energizing path for audible signal 235 and the energizing path for the lamp of combined line lamp and key 238. Also, relay 2L, released, interrupts at make contact 2L–3(2) the connection of ground to lead 207 of the control pair and reconnects battery thereto through break contact 2L–2(2).

As shown a Zener diode 342 is connected in shunt to the hold winding of relay 3TSR of telephone set 301; similar connections are provided at each of the other telephone sets of the loop. This prevents excessive battery in the relatively high resistance winding of the telephone set relay as the diode limits the IR drop across resistor 343 to a predetermined value, for example of the order of six volts, and when so conducting battery current offers a very low impedance to voice currents.

At the point in the above described call establishment when line relay 2L operated and battery potential was removed from R1 lead 207 of the control pair, relay 3T released; this relay is provided only at the "last" or farthest remote set on the loop. (Operation of relay 3T opens the far end of the talk pair which normally is closed through make contact 3T–1(3) and resistor 344.).

For purposes of further description it will now be assumed for the moment that the call originated at the second telephone set (not shown) which would be connected to the talk pair to the right of the loading point at which are located loading coils 304 and 307 and inductance coils 317 and 318, the last-mentioned two coils being the "bridge lifters" of the respective loading point. Loop current in the talk pair between the locked-in telephone set and the police station saturates the intervening bridge lifting coils, that is coils 317 and 318, while the absence of loop current beyond the locked-in station allows the bridge lifting inductors at the next load point beyond this station, that is the coils corresponding to the illustrated coils 331 and 332 of the last loading point, to effectively open the transmission path whereby to substantially reduce any transmission loss in the talk pair caused by elements included in the line beyond the connection point of the particular locked-in telephone set. This feature is important in view of the normally high noise environment encountered in emergency reporting systems as well as the difficulty often experienced by the user in speaking and hearing due to the conditions of stress.

The arrangement contemplated by my invention includes novel means whereby a continuity test is performed on each line following completion of a call thereover. This continuity testing means is common to all four lines of the segment and it will be assumed for our present purposes that a call has been completed over line No. 1 and that that line is to be tested for opens or grounds.

Following completion of the call on line No. 1 and reconnection of battery potential to lead 207 as described above, relay 3T will operate and the talk pair will be closed through make contact 3T–1(3) and resistor 344. Resistors 344 and 347 are of relatively high value, for example of the order of 36,000 ohms and 33,000 ohms respectively, and the current now flowing in the two loops, talk pair and control pair, is of relatively low value, for example of the order of .003 A. This current flow in the talk pair is not sufficient to operate line relay 2L, but is sufficient in the two loops, assuming that no opens or grounds are present, to operate relays 2C1 and 2C2 thereby holding the continuity test alarm circuit open at break contacts 2C1–1(2) and 2C2–1(2). (Relay 2SR2–1(2) released following release of relay 2T when the attendant went on hook.) Zener diodes 244 and 247 provide shunt paths to the operate windings of relays 2C1 and 2C2 respectively and prevent excessive voltage drop across the respective windings. In the event of an open or ground on the control pair relay 2C2 will release and in the event of an open or ground on the talk pair relay 2C1 will release. In either case ground will be applied to lead 248 and through break contact 2A–1(2) to operate relay 2B. Relay 2B, operated, closes a path at make contact 2B–2(2) to energize alarm lamp 261 and closes a path at make contact 2B–1(2) to operate relay 2A. Relay 2A, operated, in turn releases relay 2B after which the cycle is repeated and lamp 261 flashes to indicate the alarm condition to the attendant.

While in the above described embodiment a relay has been provided at the station locations for the purpose of connecting the set across the loop upon condenser discharge, it will be understood that other "triggerable" devices may be used for the purpose. For example a solid state device, such as a silicon controlled rectifier, may be utilized for the purpose, being triggered by capacitor discharge and "latching-in" on loop current until released in a manner generally similar to that prevailing in the relay arrangement disclosed.

It will be understood also that, while only the line equipment for line 1 has been shown in detail, the equipment provided for the other lines of the segment is similar in arrangement and operation.

It is to be understood that the above described arrangements are illustrative of the application of the principles of the invention. Numerous other arrangements may be devised by those skilled in the art without departing from the spirit and scope of the invention.

What is claimed is:

1. In a telephone system, a central station, a plurality of distributed telephone sets, transmission means between said central station and said telephone sets, said transmission means including a first pair of leads and a second pair of leads, means at each of said telephone sets connected to said first pair of leads and effective upon the respective set going off-hook for connecting the set across said second pair of leads and means at said control station for disconnecting the set from said second pair of leads while said set is still in off-hook condition.

2. In a telephone system the combination defined by claim 1 further characterized in that said set connecting means includes a circuit closing device effective when operated to connect the respective set across said second pair of leads and means controlled over said first pair of leads for operating said device.

3. In a telephone system the combination defined by claim 2 further characterized in that said circuit closing device comprises a relay.

4. In a telephone system the combination defined by claim 3 further characterized in that said means for operating said device includes a capacitor, means for charging the capacitor and means for discharging said capacitor through the operate winding of the relay.

5. In a telephone system the combination defined by claim 4 further characterized in means effective upon operation of a respective one of said relays for applying holding potential for said one relay over said second pair of leads.

6. In a telephone system the combination defined by claim 5 further characterized in that said last-mentioned means includes a potential source, an additional lead for connecting said potential source to said second pair of leads and a break contact of a normally released relay included in said additional lead.

7. In a telephone system the combination defined by claim 6 further characterized in that said disconnecting means includes means for operating said normally released relay whereby to remove said holding potential from said second pair of leads.

8. In a telephone system the combination defined by claim 7 further characterized in a telephone set at said control station, an additional relay at said control station and means effective upon said last-mentioned telephone set going off-hook for operating said additional relay, a make contact of said additional relay being included in the operate path of said normally released relay.

9. In a telephone system the combination defined by claim 8 further characterized in that said additional lead for connecting said potential source also includes a make contact of said additional relay connected in shunt to said break contact of said normally released relay.

10. In a telephone system, a central control station, a plurality of distributed telephone sets, transmission means between said control station and said telephone sets, said transmission means including a first pair of leads and a second pair of leads, a capacitor at each of said telephone sets, means including said first pair of leads and effective when the associated telephone set is on-hook for charging each of said capacitors, a relay at each of said telephone sets having an operate winding and effective when operated to connect the associated telephone set across said second pair of leads, and means effective upon a telephone set going off-hook for discharging the associated capacitor through the operate winding of the relay at the telephone set whereby to operate the relay and connect the telephone set across said second pair of leads.

11. In a telephone system, the combination defined by claim 10 further characterized in means effective upon connection of said telephone set across said second pair of leads for discharging the capacitors associated with all the other telephone sets.

12. In a telephone system, the combination defined by claim 11 further characterized in that said last-mentioned means includes means for applying ground to said first pair of leads.

13. In a telephone system, a central control station, a plurality of distributed telephone sets, common transmission means connecting said sets and said control station, said transmission means including a talk pair of leads and a control pair of leads, a capacitor at each of said telephone sets, means including said control pair of leads and effective when the associated telephone set is on-hook for charging each of said capacitors, and means responsive to a telephone set going off-hook for discharging the associated capacitor to connect the telephone set across the talk pair of leads.

References Cited

UNITED STATES PATENTS

| | | | |
|---|---|---|---|
| 835,181 | 11/1906 | Davidson | 179—81 |
| 1,145,632 | 7/1915 | Ude | 179—81 |
| 1,436,570 | 11/1922 | Bohac | 179—84 |

KATHLEEN H. CLAFFY, Primary Examiner

JAN S. BLACK, Assistant Examiner

U.S. Cl. X.R.

179—17, 81